(12) United States Patent
Jouanneau et al.

(10) Patent No.: US 8,404,381 B2
(45) Date of Patent: Mar. 26, 2013

(54) OPTIMISED POSITIVE ELECTRODE MATERIAL FOR LITHIUM CELL BATTERIES, METHOD FOR THE PRODUCTION THEREOF, ELECTRODE, AND BATTERY FOR IMPLEMENTING SAID METHOD

(75) Inventors: Severine Jouanneau, Fontaine (FR); Frederic Le Cras, Notre Dame de L'Osier (FR); Carole Bourbon, Saint Michel de Saint Geoirs (FR); Helene Lignier, Saint Laurent du Pont (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 13/307,049

(22) Filed: Nov. 30, 2011

(65) Prior Publication Data

US 2012/0068129 A1 Mar. 22, 2012

Related U.S. Application Data

(62) Division of application No. 11/577,910, filed as application No. PCT/FR2005/051074 on Dec. 12, 2005, now abandoned.

(30) Foreign Application Priority Data

Dec. 21, 2004 (FR) ...................... 04 53125

(51) Int. Cl.
*H01M 4/13* (2010.01)
*H01M 4/00* (2006.01)
*H01M 4/58* (2010.01)
*H01B 1/02* (2006.01)

(52) U.S. Cl. ..... 429/224; 429/223; 429/221; 429/231.4; 252/519.15

(58) Field of Classification Search ........................ None
See application file for complete search history.

(56) References Cited

U.S. PATENT DOCUMENTS

2003/0138696 A1 7/2003 Peres et al.
2004/0202938 A1* 10/2004 Noguchi et al. ......... 429/231.95

FOREIGN PATENT DOCUMENTS

FR 2831993 4/2007
JP 2002-158007 * 5/2002

OTHER PUBLICATIONS

Kim et al, Comparative Study of LiNi0.5Mn1.5O4-ä and LiNi0.5Mn1.5O4 Cathodes Having Two Crystallographic Structures: Fd3hm and P4332, Chem. Mater 2004, 16, 906-914.*
Jhong et al, Synthesis and Electrochemistry of LiNiMn2_O4, J. Electrochem. Soc. 144, 1997 205-213.*
Ito et al, Relation between crystal structures, electronic structures, and electrode performances of LiMn2_xMxO4 (M ¼ Ni, Zn) as a cathode active material for 4V secondary Li batteries, J. Power Sources, 119-121 (2003) 733-737.*
Patent Abstracts of Japan, vol. 2002, No. 9, Sep. 4, 2002, JP 2002158007 A (Tanaka Chemical Corp), May 31, 2002.
Perentzis, G. et al., Synthesis and electrochemical study of Li-Mn-Ni-O cathodes for lithium battery applications, J. Solid State Electrochem, vol. 8, 2003, pp. 51-54.
Ito, Yuka et al, Relation between crystal structures, electronic structures, and electrode performances of LiMn2-xMx04 (M = Ni, Zn) as a cathode active material for 4V secondary Li batteries, Journal of Power Sources, Elsevier, vol. 119-121, 2003, pp. 733-737.
Patent Abstracts of Japan, vol. 1996, No. 12, Dec. 26, 1996, JP 08217452 A (Tosoh Corp), Aug. 27, 1996.
Kim, J.-H. et al., Comparative study of LiNi0.5Mn1.50(4-d) and LiNi0.5Mn1.5O4 cathodes having two crystallographic structures: Fd-3m and P4(3)32, Chem. Mater., vol. 16, 2004, pp. 906-914.
International Search Report received in connection with PCT/FR2005/051074 (Mar. 16, 2006).

* cited by examiner

*Primary Examiner* — Melvin C Mayes
*Assistant Examiner* — Bijay Saha
(74) *Attorney, Agent, or Firm* — Heslin Rothenberg Farley & Mesiti P.C.

(57) ABSTRACT

A material or compound is provided having a spinel structure and corresponding to the formula $Li_yNi_{0.5}Mn_{1.5-x}^{IV}Mn_x^{III}A_zO_{4-d}$, where:

$0.02 \leq x \leq 0.35$;
$d > 0$;
A is selected from the group comprising Na, K, Mg, Nb, Al, Ni, Co, Zr, Cr, Fe, Cu, Ti, Zn, Si and Mo;
$0.8 \leq y \leq 1.2$;
$0 \leq z \leq 0.1$; and has a mesh parameter of between 8.174 and 8.179 Å.

8 Claims, No Drawings

OPTIMISED POSITIVE ELECTRODE MATERIAL FOR LITHIUM CELL BATTERIES, METHOD FOR THE PRODUCTION THEREOF, ELECTRODE, AND BATTERY FOR IMPLEMENTING SAID METHOD

CROSS-REFERENCE TO RELATED APPLICATIONS

This application is a divisional of U.S. application Ser. No. 11/577,910, filed on Apr. 25, 2007 (and published as U.S. 2009-0130558 on May 21, 2009), now abandoned, which is a Section 371 filing of International Application PCT/FR2005/051074, filed on Dec. 12, 2005 and published, in French, as International Publication No. WO 2006/067345 on Jun. 29, 2006, which claims priority from French application no. 0453125 filed on Dec. 21, 2004, which applications are hereby incorporated by reference herein, in their entirety.

TECHNICAL FIELD

The present invention relates to a novel compound with a spinel structure, of the mixed oxide type based on Ni, Mn and Li, non-stoichiometric and having a clearly defined mesh parameter.

Such a compound has optimised properties, in terms of stability and electrochemical performance.

In consequence, it is advantageously used in electrodes, batteries and cell batteries containing lithium.

PRIOR ART

Lithium cell batteries are increasingly used as self-contained energy sources, particularly for portable equipment, where they progressively tend to replace nickel-cadmium (NiCd) and nickel-metal hydride (NiMH) batteries. This development stems from the fact that the performance of lithium cell batteries, in terms of power density (Wh/kg, Wh/l), is substantially superior to that of the two abovementioned technologies.

The active electrode compounds used in these batteries mainly have the formulas $LiCoO_2$, $LiNiO_2$ and $LiMn_2O_4$ for the positive electrode, and carbon (graphite, coke, etc.) for the negative electrode. The theoretical and practical capacitances of these compounds are respectively 275 mAh/g and 140 mAh/g for $LiCoO_2$ and $LiNiO_2$, and 148 mAh/g and 120 mAh/g for $LiMn_2O_4$, for an operating voltage close to 4 volts with respect to lithium metal.

The existing compound $LiNi^{II}_{0.5}Mn^{IV}_{1.5}O_4$, having a spinel structure, is electrochemically active reversibly at a potential of 4.7-4.8 V/Li/Li$^+$. Its theoretical specific capacitance is 147 mAh/g. This gives it a theoretical power density of about 700 Wh/Kg/Li$^+$/Li.

Despite numerous and varied studies on materials derived from $LiMn_2O_4$, few data are available on the compound $LiNi_{0.5}Mn_{1.5}O_4$. The main data available concern the optimisation of its synthesis and the electrochemical behaviour and performance of this material, as positive electrode for a lithium battery.

It should be noted that the term "electrochemical performance" of a material pertains to two different concepts:
- the capacity to respond to high current (power) densities; and
- the capacity to have a long cycling service life (high and stable capacitance in cycling).

These two properties can be obtained simultaneously for a given compound, but this simultaneous feature is not systematically obtained. Depending on the target application, one and/or the other of these properties is therefore desirable.

Document JP-A-8 217452 discloses a material with a spinel structure, with the formula $LiNi_xMn_{2-x}O_4$, in which x is between 0 and 0.5 inclusive. It is reported that this compound has good cycling properties (without specification), due to the use, as precursor, of a manganese oxide $MnO_2$ having a specific surface area of 150 to 500 m$^2$/g.

Document FR 2 831 993 relates to the doping of a compound with the general formula $LiMn_{2(x+y)}M_xM'_yO_4$ by element M', with M=Ni or Co and M'=Ti, Al, Co, Mo, x and y strictly positive. This results in a material which operates well at high potential, with high capacitance and good cycling properties.

Furthermore, other studies, such as the publication of Sun et al. (Electrochimica Acta 48(2003) 503), recommend a surface treatment of the material (based on ZnO for example) to improve the cycling performance.

Even more recently, Kim et al. (Chem. Mat. 16(2004), 906) showed that a derivative of $LiNi_{0.5}Mn_{1.5}O_4$, non-stoichiometric, with a spinel structure Fd-3m, and a formula $Li_{1.00}Ni_{0.48}Mn_{1.5}O_{3.92}$ and mesh parameter 8.172 Å, compared with its purely stoichiometric homologue with a mesh parameter of 8.166 Å, has a better insertion kinetics, and hence better response at high current density.

Thus, values of 137 mAh/g have been obtained for the two compounds at C/7, while at 3C, a value of 110 mAh/g was measured for the non-stoichiometric compound, against 60 mAh/g for the stoichiometric compound. These better properties have been attributed by the authors to the difference in stoichiometry alone, although other crucial factors, particularly the morphology and grain size, have not been taken into account.

Patent application JP 2002 158007 A also relates to the compound with the formula $LiNi_{0.5}Mn_{1.5}O_4$, with mesh parameters of 8.18 Å or more. It is certainly demonstrated that the mesh parameters of between 8.174 and 8.179 Å can be obtained, but only after heat treatment, and hence a modification of the composition. Furthermore, the $Mn^{III}/Mn^{IV}$ distribution in this compound remains undetermined.

Methods for synthesising this class of compounds have also been described in (Perentzis et al., J. SOLID STATE ELECTROCHEM. 8(1) 2003, 51-54; Ito et al., JOURNAL OF POWER SOURCES 119-121 (2003), 733-37).

The present development of lithium cell batteries reveals the need to identify novel compounds, serving as a positive electrode material and having optimised electrochemical properties, particularly in terms of cycled capacitance and the cycling stability of this capacitance.

SUMMARY OF THE INVENTION

In the context of the invention, the Applicant has obtained compounds with a spinel structure, of the mixed oxide type based on nickel, manganese and lithium, non-stoichiometric, with novel and clearly defined formulas and morphology, having the desired properties.

Thus, the present invention relates to a compound having a spinel structure, with the formula $Li_yNi_{0.5}Mn_{1.5-x}^{IV}Mn_x^{III}A_zO_{4-d}$, with:
- $0.02 \leq x \leq 0.35$;
- $d > 0$;
- A selected from the group comprising Na, K, Mg, Nb, Al, Ni, Co, Zr, Cr, Fe, Cu, Ti, Zn, Si and Mo;
- $0.8 \leq y \leq 1.2$;
- $0 \leq z \leq 0.1$;

and having a mesh parameter of between 8.174 and 8.179 Å.

In this formulation, x hence quantifies the manganese content at oxidation degree III, d an oxygen deficiency and z the contribution of doping element A.

In general, a compound of the invention has the formula $Li_yNi_{0.5}Mn_{1.5-x}{}^{IV}Mn_x{}^{III}O_{4-d}$.

Advantageously, the formula of such a compound is $LiNi_{0.5}Mn_{1.3}{}^{IV}Mn_{0.2}{}^{III}O_{3.9}$.

According to another embodiment, the compound has a formula in which z is higher than 0, that is $0<z\leqq0.1$, indicating the presence of a doping element A.

The compound of the invention proves to have optimised properties in terms of stability and electrochemical performance in the context of its use in a lithium cell battery, during successive cyclings. Thus, values of 120 to 140 mAh/g have been observed at C/5, with 0.03 to 0.30% of loss per cycle over a hundred cycles.

In fact, the Applicant has found that in general, a stoichiometric compound had a high cycling loss, about 9% per cycle, under the test conditions, while all other things remaining equal (particularly at equivalent specific surface area), derivative non-stoichiometric compounds displayed improved capacitance preservation. With a view to industrial application, the rates of loss per cycle required must generally be about 0.04-0.05%. For the inventive compounds, it was possible to identify a window of composition in which the experimental values obtained converge towards such values. This window corresponds to spinel parameters of between 8.174 and 8.179 Å, with an optimum for 8.176-8.177 Å.

Advantageously, the inventive compounds therefore have a mesh parameter of between 8.176 and 8.177 Å.

The abovementioned document Kim et al certainly and undeniably revealed the advantage of a non-stoichiometric compound, but for a different mesh parameter and for kinetic properties, but on the contrary, did not address the problem of cycling stability. In fact, as already stated, these properties are basically decorrelated, indeed antithetical. This is because the cycling stability first demands structural stability and can then be improved by decreasing the area in contact with the electrolyte (larger particle size, lower specific surface area). On the contrary, improved kinetics generally demands the reduction of the diffusion paths, conventionally obtained by decreasing the grain size, and therefore implying an increase in specific surface area.

It is moreover desirable for the inventive compound to have a clearly defined morphology, that is, to have a particle size higher than 1 μm, preferably of between 5 and 10 μm, and specific surface area of between 1 and 2 m²/g.

This particular morphology serves to limit the reactivity to the electrolyte at high potential and therefore also contributes to limit the capacitance losses during cycling, at ambient temperature and at 55° C., the temperature at which reactivity is usually amplified.

A perfect control of the synthesis parameters, particularly with the temperature and treatment time and the type of cooling employed, are necessary to obtain the inventive compounds. The invention therefore also relates to the method for preparing the said compounds. Although several combinations are conceivable, the essential steps of such a method are as follows:

mixing of the precursors in stoichiometric conditions with a lithium excess of 1 to 5% mole;
the mixture is subjected to a first heat treatment at a temperature of between 550 and 600° C.;
the mixture is subjected to a second heat treatment at a temperature above 700° C., preferably above 800° C., combined with a cooling in oxygen containing medium, to obtain the anticipated mesh parameter.

During the first step, the precursors required to obtain the desired composition are therefore intimately mixed in stoichiometric conditions, with a lithium excess of 1 to 5 mol%. The precursors are typically based on carbonates (nickel carbonate, lithium carbonate and manganese carbonate) or on beta manganese oxide, lithine ($LiOH.H_2O$) and nickel oxide (NiO).

The first heat treatment at high temperature (about between 550 and 600° C.) lasting several hours must permit the proper incorporation of the lithium with the mixed Ni and Mn oxide.

The second heat treatment, at even higher temperature (above 700° C. and preferably above 800° C.), lasting several hours, is intended to cause a loss of oxygen, while creating the desired morphology. Advantageously, this treatment is commensurately longer as the treatment temperature is lower.

Finally, a cooling (more or less slow), adapted to the preceding treatment, is carried out in oxygen containing medium, to permit a partial oxygen return. A certain quantity of manganese with oxidation degree III must persist, corresponding to the range of mesh parameters of the invention, on completion of the protocol. A compromise between the second treatment and the type of cooling serves to obtain the inventive product.

Due to the advantageous electrochemical properties of the claimed compound, the invention also relates to the electrodes, the cell batteries which have at the negative electrode either lithium metal (lithium metal type), or a lithium insertion material (lithium-ion type) comprising the said compound as the active material, and more elaborately, batteries consisting of cells in series.

The electrodes are preferably composed of a nanodispersion of active material, with an electron conducting additive (for example carbon) and/or an organic binder conferring ion conduction and mechanical properties (for example polyether, polyester, polymers based on methylmethacrylate, acrylonitrile, vinylidene fluoride), deposited on metal sheets serving as current collectors. A mechanical separator between the two electrodes is soaked with electrolyte (ion conductor). This generally consists of a salt, whereof the cation is at least partly the lithium ion ($LiClO_4$, LiAsF6, $LiPF_6$, $LiBF_4$, $LiCH_3SO_3$, etc.), and an aprotic polar solvent (ethylene or propylene carbonate, dimethylcarbonate, diethylcarbonate, methylethylcarbonate, etc.).

All of these devices confer the requisite performance described above.

EXEMPLARY EMBODIMENT

The invention and the advantages obtained emerge clearly from the said exemplary embodiments which follow. However, these examples are not at all limiting.

EXAMPLE 1

An intimate mixture of precursors based on carbonates (10.535 g nickel carbonate, 6.468 g lithium carbonate and 30.090 g manganese carbonate) in stoichiometric conditions with an Li excess of 3 mol% is prepared by grinding with a Retsch type planetary grinder in a 250 ml bowl containing ten balls 20 mm in diameter, for 20 hours at 400 rpm, in the presence of hexane in sufficient volume to submerge the powder. The mixture is dried overnight at 60° C., and then treated at 600° C. (10 hours), and then at 900° C. (15 hours), followed by cooling to ambient temperature at the rate of 1 ° C/min. The compound obtained has the properties of the invention.

EXAMPLE 2

In another embodiment, the precursors used consist of beta type manganese dioxide, lithine (LiOH.H$_2$O) and Ni oxide, NiO. An intimate mixture of the precursors is prepared by grinding with a Retsch type planetary grinder for two hours in the presence of hexane. The mixture is then dried overnight at 60° C. and then treated at 550° C. for 60 hours, then at 700° C. (15 hours), followed by return to ambient temperature at the rate of 20° C/min. The compound obtained also has the properties of the invention.

EXAMPLE 3

A lithium metal battery is prepared comprising a negative electrode consisting of a disc of lithium (diameter 16 mm, thickness 130 microns) deposited on a nickel disc serving as a current collector, a positive electrode consisting of a 14 mm disc taken from a 50 micron thick composite film comprising the inventive material prepared according to example 1 (8% by weight), carbon black (8% by weight) as conducting material and polyvinylidene hexafluoride (12% by weight) as binder, the whole being deposited on an aluminium current collector (25 micron thick sheet) and a separator soaked with liquid electrolyte 1M LiPF$_6$ in solution in propylene carbonate. At 25° C., such a battery delivers a capacitance of 130 mAh/g, stable in cycling at C/5 (0.1% losses per cycle).

EXAMPLE 4

A lithium ion battery is prepared with a composite electrode containing the active material Li$_4$Ti$_5$O$_{12}$ (negative electrode), a composite electrode containing the inventive material prepared according to example 1 (positive electrode), a separator soaked with liquid electrolyte consisting of 1M LiPF$_6$ in solution in propylene carbonate. The composite electrode Li$_4$Ti$_5$O$_{12}$ consists of 80% by weight of active material, carbon black (8% by weight) as conducting material, and polyvinylidene hexafluoride (12% by weight) as binder, the whole being deposited on an aluminium current collector. The performance characteristics are similar to those obtained in example 3.

EXAMPLE 5

A prototype Li-ion cell battery (prototype wound with double-sided electrodes) of 450 mAh, consisting of the inventive material coupled with Li$_4$Ti$_5$O$_{12}$ was prepared in a flexible packing from thick titania and spinel electrodes coated with 300 μm (1.5 mAh/cm$^2$/side). These prototypes of 30 Ah/kg have similar capacitances in operation to those obtained at smaller scale.

The invention claimed is:

1. A method for preparing a compound having a spinel structure, said compound having a mesh parameter of between 8.174 and 8.179 Å, and a particle size of between 5 and 10 μm, and said compound having the formula Li$_y$Ni$_{0.5}$Mn$_{1.5-x}^{IV}$Mn$_x^{III}$A$_z$O$_{4-d}$, wherein:

$0.02 \leq x \leq 0.35$;

$d > 0$;

A is selected from the group consisting of Na, K, Mg, Nb, Al, Ni, Co, Zr, Cr, Fe, Cu, Ti, Zn, Si and Mo;

$0.8 \leq y \leq 1.2$; and $0 \leq z \leq 0.1$;

wherein said method comprises:

forming a mixture by mixing lithium, nickel and manganese based precursor with a lithium excess of 1 to 5 mol%;

subjecting the mixture to a first heat treatment at a first temperature of between 550 and 600° C. for a time sufficient to permit incorporation of the lithium with the nickel and manganese based precursor; and after the first heat treatment, subjecting the mixture to a second heat treatment at a second temperature above 700° C. for a time sufficient to cause a loss of oxygen, combined with a cooling in oxygen containing medium at a rate sufficient to permit a partial oxygen return;

and wherein the said compound is made by the said method.

2. The method according to claim 1, wherein the second temperature is above 800° C.

3. The method according to claim 1, wherein the compound has a specific surface area between 1 and 2 m$^2$/g.

4. The method according to claim 3, wherein the second temperature is above 800° C.

5. The method according to claim 1, wherein the compound has a formula LiNi$_{0.5}$Mn$_{1.3}^{IV}$Mn$_{0.2}^{III}$O$_{3.9}$.

6. The method according to claim 5, wherein the second temperature is above 800° C.

7. The method according to claim 1, wherein said compound has a mesh parameter of between 8.176 and 8.177 Å.

8. The method according to claim 7, wherein the second temperature is above 800° C.

* * * * *